Feb. 14, 1933.  R. EVANS  1,897,893
MEANS FOR MOLDING RUBBER STAMPS AND THE LIKE
Filed June 4, 1929
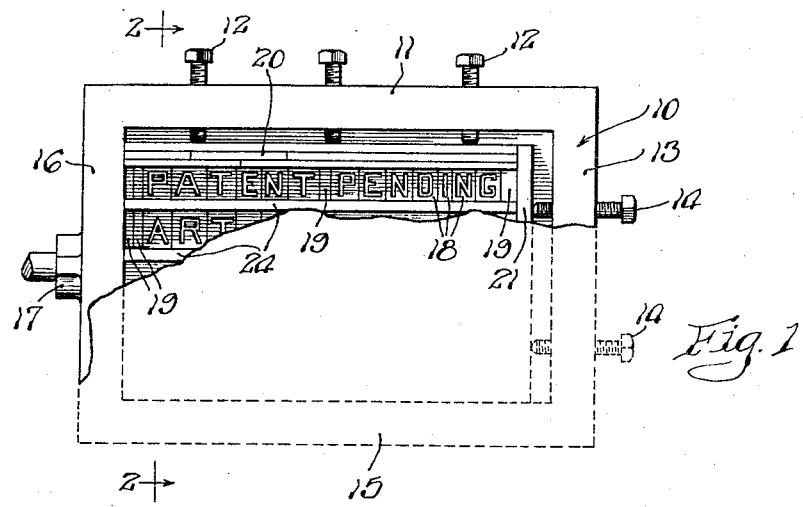
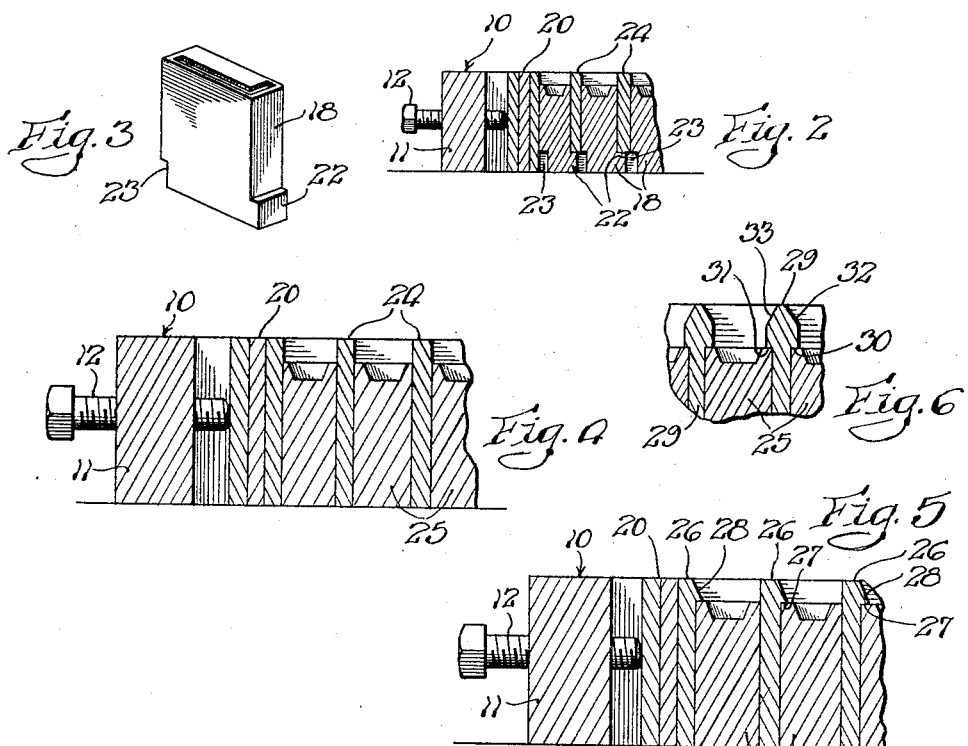
Richard Evans INVENTOR
BY Victor J. Evans
HIS ATTORNEY Patented Feb. 14, 1933

1,897,893

UNITED STATES PATENT OFFICE

RICHARD EVANS, OF HIGHLAND PARK, ILLINOIS

MEANS FOR MOLDING RUBBER STAMPS AND THE LIKE

Application filed June 4, 1929. Serial No. 368,319.

This invention relates to certain novel improvements in means for molding rubber stamps and the like and has for its principal object an improved arrangement and construction of parts which will greatly facilitate the making of rubber stamps or dies and the like, and which will be practical, simple, and economical to use.

Another important object of the invention is to provide an arrangement of a plurality of parts that will enable the making of rubber stamps and dies of various depths.

Another object of the invention is to provide an arrangement for properly aligning and planing the type-matrices when all parts are properly assembled within a frame.

A further object of my invention is to provide an arrangement in which the component parts may be expeditiously assembled in a frame to form a mold in a manner such that the parts may be expeditiously disassembled after a molding operation has been carried out. Other objects will appear hereinafter.

The invention consists in the novel combination and arrangement of parts to be hereinafter described and claimed.

The invention will be best understood by reference to the accompanying drawing, showing the preferred form of construction and in which:

Fig. 1 is a top plan view of a preferred form of construction for my invention;

Fig. 2 is a sectional view taken substantially on the line 2—2 on Fig. 1;

Fig. 3 is a perspective view showing a preferred form of construction for the type-matrices;

Fig. 4 is a view similar to Fig. 2 showing a modified form of construction;

Fig. 5 is a view similar to Fig. 2 showing a further modified form of construction; and Fig. 6 is a fragmentary view substantially similar to Fig. 5 showing a further modification of the construction as shown in Fig. 5.

In the accompanying drawing I have illustrated a preferred form of construction for my invention and referring more particularly to Figs. 1, 2 and 3, 10 indicates the clamping frame. This clamping frame is preferably made with four sides and through the sides 11 and 13 of which a plurality of adjustable bolts 12 and 14 are extended. The sides 15 and 16 are respectively arranged opposite the sides 11 and 13. A suitable arrangement may be provided for a handle indicated by 17.

A plurality of type-matrices 18 and spacers 19 are intended to be arranged side by side in such a manner that they will co-operate to form any desired reading matter in rows properly arranged in the frame so they can be clamped by means of the bolts 12 and 14. In Fig. 1 the matrices are arranged to form the words "Patent pending". A spacer 19 is arranged intermediate the words "Patent" and "Pending" and one or more spacers might be arranged at this point if desired. Spacers are also provided and arranged before and after the words "Patent pending". Words can be letter-spaced by placing a spacer between each letter and other utilities of the spacers are to fill out short sentences to a longer predetermined length and to fill in blank spaces.

After the type-matrices have been aligned in the manner shown in Fig. 1, one or more longitudinal spacers, termed leads or slugs 20, are arranged inside one side of the frame and intermediate the rows of matrices 18 and spacers 19. The various rows of matrices and leads are arranged parallel to the sides 11 and 15. Sufficient rows of matrices and leads, or other spacing members are inserted to substantially fill the area between the sides 11 and 15. Arranged along the ends of the various rows of spacers and matrices is a strip 21 against which the bolts 14 are intended to bear. The strip 21 bears against the ends of the rows of matrices and leads. By tightening the bolts 12 and 14 the matrices, spacers, and leads are securely clamped in the frame 10 and it is apparent that by loosening the bolts 12 and 14 that the matrices, spacers, and leads may be expeditiously removed from the frame.

It is to be understood that when the matrices and leads are being arranged in the frame 10, it is rested on a flat surface. In order to facilitate proper alignment of the matrices in a horizontal plane I have provided the following arrangement. On one side of the matrices 18 as best illustrated in Figs. 2 and 3 I provide an outwardly projecting shoulder 22 and a corresponding recess 23 on the opposite side. In assembling a mold, rows of type-matrices are arranged and spacing leads such as 24 can be selected and placed intermediate the rows. These spacing leads 24 are of shorter height than the leads 20 in an amount equal to the distance from the shoulder 22 to the lower end of the matrices 18. It is apparent that the lower edge of the spacers, or leads 24 will be resting on the shoulders 22 and consequently by placing a suitable flat implement on the upper edges of the leads 24 and tapping the same, all of the matrices 18 will be brought into proper horizontal alignment and the distance from the top of the matrices to the top of the spacers 20 and 24 will be equal, with the result that the devices molded will be of uniform thickness.

In the upper faces of the type-matrices 18 letters, numerals, or other desired indicia are depressed. These depressions are all of equal depth. It is frequently desired, however, that rubber stamps, or dies, of different thicknesses be formed and in order to accomplish this I provide spacers, or leads and slugs of different heights so that they will project in greater or less amounts above the upper surfaces of the matrices 18 and form channels above the rows of matrices which are equal in depth to the distance from the face of the matrices 18 to the top edge of the spacers. Consequently when rubber or other substance is molded into the channels and type-matrices, it is apparent that the depth of these channels will control the thickness of the product, and it is, therefore, manifest that if the height of the spacers be varied, the thickness of the stamps will be varied. The spacers 19 may be made to either extend for substantially the same distance above the upper faces of the matrices 18 as the spacers 20 and 24 or they may be made to extend to any other desired amount.

In the embodiment of the invention illustrated in Fig. 4, I show matrices 25 which do not have the shoulders or projections 22, the sides of the matrices in this instance being substantially straight. In arranging these matrices in the frame 10 leads such as 20 may be employed in places where leads such as 24 were employed in the construction hereinbefore described. In this instance the matrices are horizontally aligned by properly setting them into position.

In the embodiment of the invention illustrated in Fig. 5 matrices 25 are employed. However, in this instance spacing leads such as 26 are employed which have shoulders 28 provided thereon adjacent the upper ends thereof and these shoulders 28 bear against the upper surfaces 27 of the matrices 25 and in this manner the matrices are aligned. As is clearly shown in Fig. 5, the shoulder 28 of the spacers 26 is tapered and it is obvious that the product molded therefrom will have this taper formed thereon.

In Fig. 6 a further modified form of construction is shown. Herein leads 29 are employed which have two shoulders 30 and 31 provided on opposite sides thereof and these shoulders act substantially similar to the shoulder 28. In this instance the walls above the shoulders 30 and 31 are arranged to extend perpendicular for a short distance and are then tapered as indicated at 32 and 33. It is therefore apparent that a stamp or die molded in this arrangement will have tapered footing and this arrangement can be employed for inserting the stamp or die into dovetailed grooves or the like.

It is to be understood that the spacers 19 may be constructed in the manner substantially similar to the formation of the matrices 18 or 25 with which they are associated and these spacers may be provided in proper heights.

The longitudinal spacers 20 and 24 can be of thin width and the edge extending away from the matrices 18 can be sharp when so desired causing the dies being vulcanized to be separated into separate units.

It is also to be understood that spacers 20 and 24 may be provided with tapered sides such as 32 or 33 and spacers 26 and 29 may be provided without tapered sides.

From the foregoing description it is manifest that I have provided a construction which will greatly facilitate the molding of rubber stamps by providing a collapsible mold which can readily be assembled, disassembled and again reassembled in different formations employing the same members. I have also incorporated a provision for making stamps or dies of various predetermined thicknesses with tapered sides when so desired.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention what I claim as new and desire to protect by Letters Patent is:

1. In combination with a set of type matrices having indicia sunken therein, adjustably associated members for clamping the type matrices in position to form a groove located above the indicia in the type, said type matrices having shoulders formed thereon whereby said adjustably associated members may engage said shoulders to force said type matrices into alignment.

2. The combination with a mold frame, of a plurality of spacers and matrices, each of said matrices having an outstanding lug on one wall thereof providing a shoulder and a recess in the opposite wall, said spacers being adapted to rest on said shoulders when in assembled position with said matrices and said lugs being receivable in said recesses to provide a groove above the indicia bearing surfaces of each row of matrices adapted to receive plastic material in uniform depth therein.

3. The combination with a mold frame, of a plurality of spacers and matrices, said spacers being arranged in pairs with a matrix therebetween, each of said matrices having an outstanding lug on one wall thereof providing a shoulder and a recess in the opposite wall substantially equal in size to said lug, said spacers being adapted to rest on said shoulders when in assembled position with said matrices so that said lugs will be receivable in said recesses, whereby said spacers will project above the indicia bearing surfaces of said matrices a distance equal to the distance from the top of said shoulders to the bottom of said matrices to provide a groove above the indicia bearing surfaces of each row of matrices adapted to receive plastic material in uniform depth therein, and whereby the upwardly projecting portions of said spacers may be tapped with a suitable implement to force said matrices into alignment.

In testimony whereof I affix my signature.

RICHARD EVANS.